US008031109B2

(12) United States Patent
Barrick et al.

(10) Patent No.: US 8,031,109 B2
(45) Date of Patent: Oct. 4, 2011

(54) COMBINED TRANSMIT/RECEIVE SINGLE-POST ANTENNA FOR HF/VHF RADAR

(75) Inventors: Donald E. Barrick, Redwood City, CA (US); Peter M. Lilleboe, San Jose, CA (US)

(73) Assignee: Codar Ocean Sensors, Ltd., Mountain View, CA (US)

( * ) Notice: Subject to any disclaimer, the term of this patent is extended or adjusted under 35 U.S.C. 154(b) by 270 days.

(21) Appl. No.: 12/505,093

(22) Filed: Jul. 17, 2009

(65) Prior Publication Data

US 2011/0012776 A1 Jan. 20, 2011

(51) Int. Cl.
*G01S 7/02* (2006.01)
*H01Q 7/00* (2006.01)
*G01S 13/00* (2006.01)

(52) U.S. Cl. ............ 342/175; 342/82; 342/89; 343/725; 343/728; 343/741; 343/866; 343/867; 343/874

(58) Field of Classification Search .................... 342/27, 342/82, 89, 175, 59, 90, 104, 118, 125, 165; 343/722, 725, 726, 728, 729, 731, 732, 741–745, 343/748, 757, 763, 764, 787, 788, 850, 853, 343/855, 866–871, 874, 875
See application file for complete search history.

(56) References Cited

U.S. PATENT DOCUMENTS 5,361,072 A * 11/1994 Barrick et al. ................ 342/175
6,774,837 B2 * 8/2004 Barrick et al. .................. 342/59
6,856,276 B2 * 2/2005 Barrick et al. .................. 342/59
6,919,839 B1 * 7/2005 Beadle et al. ................. 342/118
6,963,301 B2 * 11/2005 Schantz et al. ................ 342/118
7,298,314 B2 * 11/2007 Schantz et al. ................ 342/125
7,414,571 B2 * 8/2008 Schantz et al. ................ 342/125
7,538,715 B2 * 5/2009 Langford et al. ............... 342/90
7,592,949 B2 * 9/2009 Schantz et al. ................ 342/165
7,688,251 B2 * 3/2010 Barrick et al. ................ 342/104
7,859,452 B2 * 12/2010 Schantz et al. ................ 342/165
2006/0132352 A1 * 6/2006 Schantz et al. ................ 342/118

* cited by examiner

*Primary Examiner* — Bernarr Gregory
(74) *Attorney, Agent, or Firm* — Weaver Austin Villeneuve & Sampson LLP

(57) ABSTRACT

An antenna configuration is described for high frequency (HF) or very high frequency (VHF) radars contained in a single vertical post. The radar may include a vertical dipole or monopole transmitting antenna collocated with a three-element receive antenna. The three antennas including two crossed loops and a vertical element are used in a direction-finding (DF) mode. Isolation between the three antennas produces high quality patterns useful for determining target bearings in DF mode. The single vertical post is sufficiently rigid mechanically that it may be installed along a coast without guy wires.

19 Claims, 6 Drawing Sheets

COMBINED TRANSMIT/RECEIVE SINGLE-POST ANTENNA FOR HF/VHF RADAR

BACKGROUND

1. Field of the Invention

The present methods, devices, and systems relate generally to the field of radars, and more particularly to HF/VHF radars that scatter signals from ocean surface or from targets such as ships on the sea. Specifically, the present methods, devices, and systems invention relate to antenna systems useful for such radars. The present methods, devices, and systems facilitate reduction in antenna system size while providing the level of performance found in current larger antenna systems.

2. Description of the Related Art

HF radars have been used since the 1960s. When located at coastal areas and transmitting vertical polarization, HF radar systems may exploit the high conductivity of sea water to propagate their signals (e.g., in a surface-wave mode) well beyond the visible or microwave-radar horizon. Although HF surface-wave radar (HFSWR) was initially considered for detecting military targets beyond the horizon (e.g., ships, low-flying aircraft or missiles), HFSWR also found widespread acceptance and use in the mapping of sea surface currents and the monitoring of sea state (e.g., waveheights). The radar echo used in these sea mapping/monitoring applications comes from Bragg scatter by ocean surface waves that are about half the radar wavelength, traveling toward and away from the radar.

Conventional radars determine target bearing by forming and scanning narrow beams using radar antennas. One procedure for sea mapping/monitoring using HFSWR has been to use a transmit antenna system that floodlights a large bearing sector of the sea (e.g., 60°) with illumination. A separate receive phased-array then forms a narrow beam that is scanned across the illuminated sector using software algorithms after signal digitization. The beamwidth (i.e., angular resolution) depends on the length of the antenna aperture, being proportional in radians to the wavelength divided by the array length. Because the wavelength at HF may be almost 1000 times greater than for microwave radars, the length of an HF array may be hundreds of meters long. While such radars were built and operated in the 1960s, antenna size and related cost impeded widespread acceptance. Coastal locations are valuable land for other public and private use, and suitable locations for large antennas as coastal structures are difficult to obtain.

Compact HF radar systems may take the place of the above-described large phased arrays. CODAR systems have employed separate transmit and receive antenna subsystems, with the two units separated by up to a wavelength. In many cases, such structures were still considered to be too obtrusive, and therefore incompatible with public use in beach areas, or for deployment on oil platforms or building rooftops.

These compact antenna systems for sea mapping/monitoring coastal radars included separate transmit and receive antenna subsystems. The transmit unit was usually an omnidirectional monopole, and the receive unit consisted of two crossed loops coaxially collocated on a vertical monopole. Such antenna systems were sufficiently compact that they were suitable for mounting on offshore oil platforms and on coastal building rooftops. Reductions in size may be achieved by replacing the large air loops employed by earlier technology with tiny crossed ferrite loopsticks housed in a weatherproof box on the post surrounding the monopole.

The loopstick antennas take advantage of the fact that an inefficient HF receive system will cause reduction of the desired target signal as well as a proportional reduction in the external noise. Therefore a signal to noise ratio (SNR) of the HF receive system may remain constant with decreased efficiency, to the point where the external noise is approaches the internal receiver noise, at which point SNR begins to suffer. Thus, the size and cost of the HF receiver antenna subsystem can be reduced (thereby decreasing its efficiency) to the point that the external noise approaches the internal receiver noise before any SNR penalty is experienced by the HF receiver antenna subsystem.

Coastal space available for radar antenna systems continues to shrink, and further reductions in size are desired. Coupling between transmit and receive antennas in a radar system reduce performance of the radar antenna system. Furthermore, external obstacles nearby such as power lines, buildings, fences, and trees all exacerbate mutual coupling problems.

SUMMARY

According to one aspect of the disclosure, an antenna system can be configured to transmit and receive (e.g., an antenna system that transmits and receives) radar signals includes a compact receive unit configured to receive HF or VHF radar signals. The compact receive unit includes a first loopstick antenna having a first phase center and a first loopstick axis. The compact receive unit also includes a second loopstick antenna having a second phase center and a second loopstick axis. The second loopstick axis is substantially orthogonal to the first loopstick axis. The compact receive unit is disposed within a receive unit enclosure that is hermetically sealed. The antenna system also includes a transmit/receive unit configured to transmit and receive the HF or VHF radar signals. The transmit/receive unit includes a substantially vertical transmit/receive antenna having a transmit/receive phase center. The transmit/receive phase center, the first phase center, and the second phase center are substantially collinear along a substantially vertical axis. A transmit/receive axis of the substantially vertical transmit/receive antenna is substantially orthogonal to the first loopstick axis and to the second loopstick axis. The transmit/receive unit also includes a conducting cylinder enclosing at least a portion of the substantially vertical transmit/receive antenna. The transmit/receive unit further includes at least one decoupling device inside the conducting cylinder and surrounding a portion of the substantially vertical transmit/receive antenna to decouple the substantially vertical transmit/receive antenna from the conducting cylinder and/or from the loopstick antennas. The antenna system also includes a receiver module coupled to the compact receive unit and to the transmit/receive unit. The receiver module is configured to receive a first receiver input signal from the compact receive unit. The receiver module is also configured to receive a second receiver input signal from the transmit/receive unit. The receive module is further configured to output a signal that is amplified and sent to the transmit/receive unit for radiation.

Any embodiment of any of the present methods and systems may consist of or consist essentially of—rather than comprise/include/contain/have—the described functions, steps and/or features. Thus, in any of the claims, the term "consisting of" or "consisting essentially of" may be substituted for any of the open-ended linking verbs recited above, in order to change the scope of a given claim from what it would otherwise be using the open-ended linking verb.

BRIEF DESCRIPTION OF THE DRAWINGS

The following drawings form part of the present specification and are included to further demonstrate certain aspects of the present methods and apparatuses. The drawings illustrate by way of example and not limitation. Identical reference numerals do not necessarily indicate an identical structure. Rather, the same reference numeral may be used to indicate a similar feature or a feature with similar functionality. Not every feature of each embodiment is labeled in every figure in which that embodiment appears, in order to keep the figures clear.

DESCRIPTION OF ILLUSTRATIVE EMBODIMENTS

Figure 1:
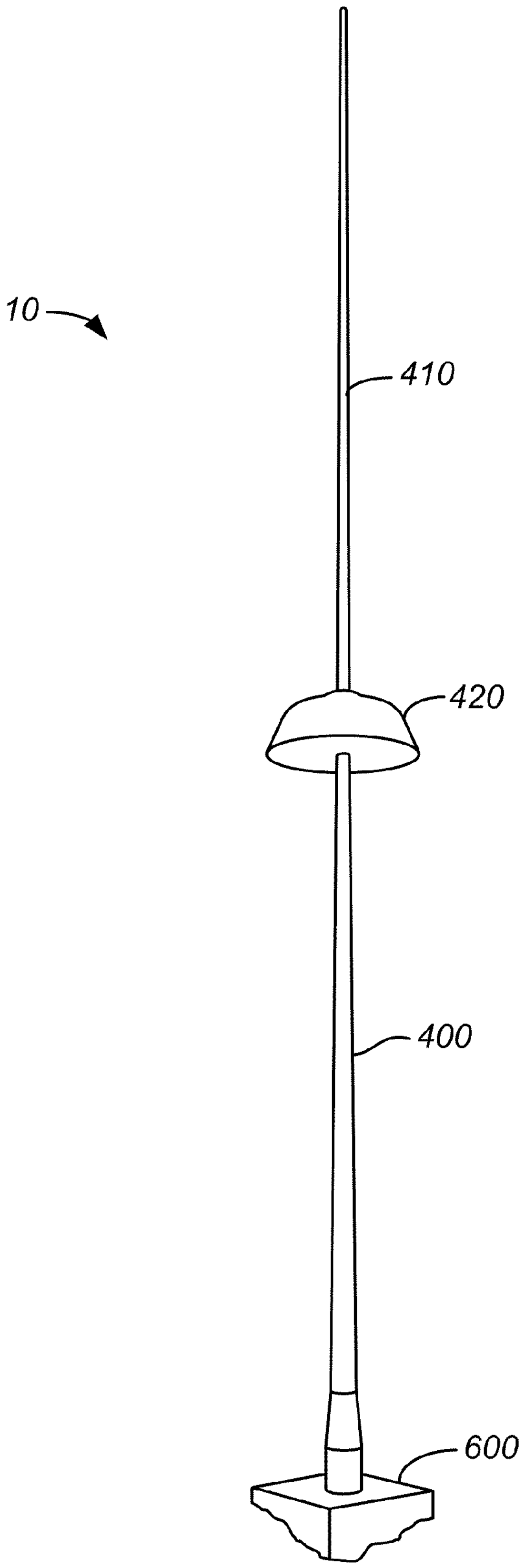
FIG. 1 is an illustration of a combined radar transmit and receive antenna according to one embodiment.

The terms “comprise” (and any form of comprise, such as “comprises” and “comprising”), “have” (and any form of have, such as “has” and “having”), “include” (and any form of include, such as “includes” and “including”) and “contain” (and any form of contain, such as “contains” and “containing”) are open-ended linking verbs. Thus, a method comprising certain steps is a method that includes at least the recited steps, but is not limited to only possessing the recited steps. Likewise, a device or system comprising certain elements includes at least the recited elements, but is not limited to only possessing the recited elements.

The terms “a” and “an” are defined as one or more than one, unless this application expressly requires otherwise. The term “coupled” is defined as connected, although not necessarily directly, and not necessarily mechanically.

A difference in efficiency between transmit and receive antennas may influence sensitivity to coupling. Improved transmit antenna efficiency is obtained at vertical sizes between a quarter and a half wavelength. Currents may be induced on such antennas at or near resonance. On the other hand, inefficient loop antennas may be used for receive antennas because they are compact and low cost. Loop antennas may have low radiative current flow. As a result, the efficient element with high currents represents an unbalance when physically located near the inefficient antenna with small currents.

A slight perturbation in a current on the transmit antenna may be bigger than a current on the receive antenna. This small perturbation may be produced by some dissymmetry with the loop antennas, feed lines, or from nearby metallic or dielectric obstacles that are often unavoidable. The transmit antenna current perturbation induces a weak current on the loop antenna that disrupts received signals. Thus, the transmit antenna is coupled to the loop antenna resulting in disrupted signals at the loop antenna. Coupling may be calculated according to the equation given below.

Coupling=loop/dipole inefficiency+loop/dipole isolation (dB)

Both the loop/dipole inefficiency quantity and the loop/dipole isolation quantity are negative numbers. The coupling may be measured with a network analyzer as the ratio of the measured current out of the loop to the current into the dipole (or monopole). The output current from the loop includes gain from preamplifiers. According to one embodiment, loop/dipole isolation for acceptable received loop antenna patterns may be 20 dB.

For example, at 12-14 MHz the loop/dipole inefficiency ratio may be −10 to −12 dB. This includes loop antenna preamplifier gain, which may be 20 dB. Without the preamplifier the inefficiency may be −30 to −32 dB. Based on the above equation, according to one embodiment, a coupling level may be −30 to −32 dB for 12-14 MHz. The difference in efficiencies may grow (decrease) as the frequency is reduced (raised). For another example, at 4-5 MHz an inefficiency ratio may be −20 to −22 dB, and coupling may be −40 to −42 dB. In a further example, at 24-27 MHz an inefficiency ratio may be −5 dB and coupling may be −25 dB.

An antenna system as described below combines transmit and receive antennas in a small form factor that occupies small land areas and is hermetically sealed against natural elements such as rain. Coupling between the transmit and receive antennas is reduced to allow the transmit and receive antennas to be collocated without distorting the signal patterns received by the antenna system.

FIG. 1 is an illustration of a combined radar transmit and receive antenna according to one embodiment. An antenna system 10 includes a receive unit enclosure 420 attached to a mast 400. The mast 400 is oriented substantially vertical to the ground. The mast 400 may be a conducting tube (e.g., aluminum) through which feed wires run surrounded by a fiberglass tube. A portion of the antenna system 410 above the receive unit enclosure 420 may have a semi-rigid whip structure. The location of the receive unit enclosure 420 on the mast 400 may vary such that the portion of the antenna system 410 extends above the receive unit enclosure 420. According to one embodiment, the receive unit enclosure 420 may be located between about 10 and about 90 percent (e.g., 10, 20, 30, 40, 50, 60, 70, 80, 90 percent) along the length of the mast 400 above a concrete footer 600. For example, the receive unit enclosure 420 may be located half way up the mast 400 from the concrete footer 600.

The receive unit enclosure 420 is hermetically sealed and protected from natural elements such as rain resulting in a watertight and weatherproof structure. The antenna system 10 is mechanically stable by mounting the mast 400, for example, in the concrete footer 600, allowing the antenna system 10 to stand freely without the use of horizontally extending guy wires. Thus, the antenna system 10 occupies a small footprint in coastal land.

According to one embodiment the antenna system 10 may operate in high frequency (HF) or very high frequency (VHF) ranges. If a frequency range such as, for example, 12-14 MHz is desired the antenna system 10 may include a dipole antenna. In this frequency range, a height of the antenna system 10 may be one half the wavelength of operation or 60% to 100% of one half the wavelength of operation (e.g., approximately 25 feet). If a frequency range such as, for example, 4-5 MHz is desired the antenna system 10 may include a monopole antenna with radial ground-screen wires lying on the ground or buried slightly beneath the surface. A monopole antenna is generally one half of a dipole antenna and may have a ground plane on the ground. In this frequency range, a height of the antenna system 10 may be one quarter the wavelength of operation or 60% to 100% of one quarter the wavelength of operation.

The dipole or monopole antenna may be housed in the mast 400 and/or the portion 410 and operate as both a transmit and receive antenna. The receive unit enclosure 420 may house additional receive antennas such as, for example, crossed loop antenna elements. The antenna system 10 may receive and process one or more signals.

Coupling between antennas housed in the receive unit enclosure 420, the mast 400, and the portion of the antenna system 410 may be reduced my adjusting a location of the receive unit enclosure 420 in the antenna system. Two example locations for the receive unit enclosure 420 are presented in FIGS. 2A-2B.

Figure 2A:
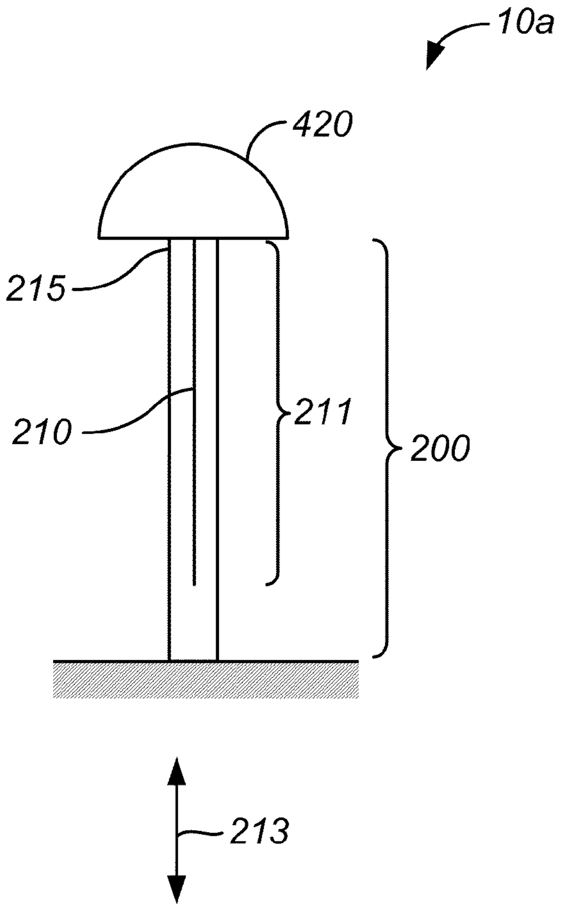
FIG. 2A is a profile view of a combined radar transmit and receive antenna having a receive unit at a top end according to one embodiment.

FIG. 2A is a profile view of a combined radar transmit and receive antenna having a receive unit at a top end according to one embodiment. An antenna system 10*a* includes a receive unit enclosure 420 mounted on a top end 215 of a transmit/receive unit 200. The transmit/receive unit 200 includes a transmit/receive antenna 210, such as a dipole or monopole, having a length 211. A transmit/receive axis 213 of the antenna system 10*a* is substantially parallel to the transmit/receive antenna 210.

In this embodiment, antennas located in the receive unit enclosure 420 are positioned at locations where undesired coupling of the antennas in the receive unit enclosure 420 to currents resulting from the transmit/receive antenna 210 are low. Thus, coupling between the transmit/receive antenna 210 and the receive unit enclosure 420 is reduced.

Although the receive unit enclosure 420 is shown on the top end 215, the receive unit enclosure 420 may be mounted anywhere along the transmit/receive unit 200. An alternative arrangement of the receive unit enclosure 420 is shown in FIG. 2B.

Figure 2B:
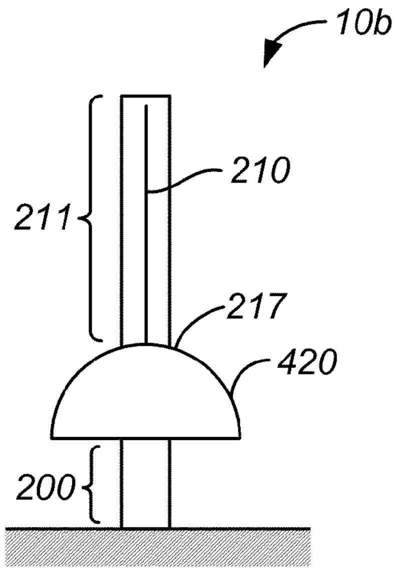
FIG. 2B is a profile view illustrating a combined radar transmit and receive antenna having a receive unit at a bottom end according to one embodiment.

FIG. 2B is a profile view illustrating a combined radar transmit and receive antenna having a receive unit at a bottom end according to one embodiment. The antenna system 10*b* includes the receive unit enclosure 420 mounted above the transmit/receive unit 200. The transmit/receive antenna 210 having the length 211 is mounted above the receive unit enclosure 420 on a bottom end 217 of the transmit/receive antenna 210.

Coupling between antennas in the receive unit enclosure 420 and the mast 400 and the portion 410 may be reduced when the receive unit enclosure 420 is located near a bottom end of the antenna system 10*b* because coupling with currents from the dipole or monopole antenna are reduced. Additionally, coupling may be reduced through adjusting a feed point of the antenna in the mast 400 and portion 410. Off-center feeds for antennas provide adjustable matching impedance and tapering of a vertical current distribution to reduce coupling.

Figure 3:
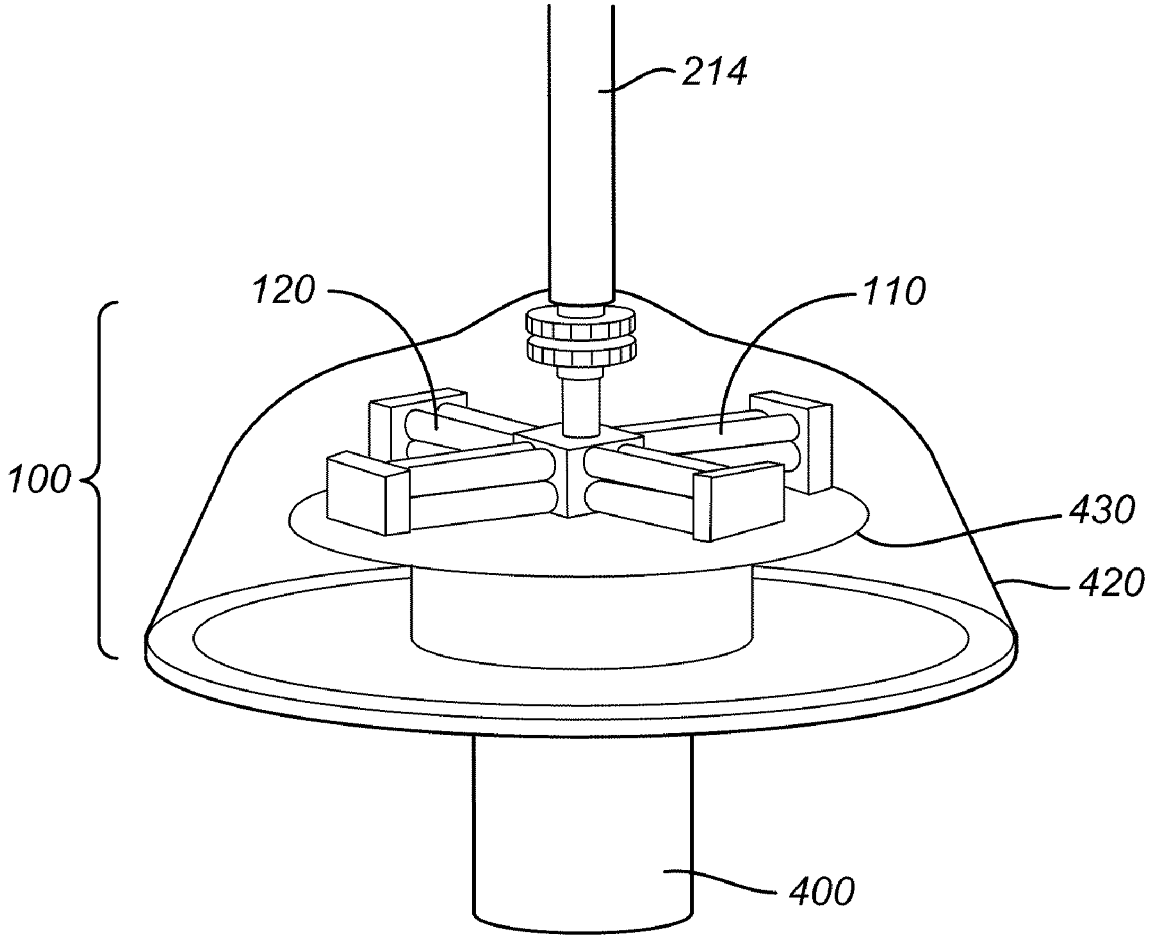
FIG. 3 is a cross-sectional view illustrating a receive unit according to one embodiment.

FIG. 3 is a cross-sectional view illustrating a receive unit according to one embodiment. The receive unit enclosure 420 is mounted on the mast 400 and coupled (e.g., attached) to an upper dipole antenna portion 214.

The receive unit enclosure 420 has a compact receive unit 100, which includes a first loopstick antenna 110 collated with a second loopstick antenna 120. The second loopstick antenna 120 is aligned substantially orthogonal to the first loopstick antenna 110. Thus, a first loopstick axis or plane is substantially orthogonal to a second loopstick axis or plane. Further, the first loopstick axis and the second loopstick axis are substantially orthogonal to a transmit/receive axis 213 of the transmit/receive unit 200. The first loopstick antenna 110 has a first phase center, and the second loopstick antenna 120 has a second phase center. The first phase center and the second phase center may be located collinear with or collocated along a substantially vertical axis with a transmit/receive phase center of the transmit/receive unit 200.

Windings around the loopstick antennas 110, 120 have a number of turns selected, in part, such that a resonant condition is realized for the frequency band of operation. The resonant condition may also be selected, in part, using a fixed or adjustable tuning capacitance (not shown) in series with the loopstick antennas 110, 120. That is, the frequencies of operation of the compact receive unit 100 may be adjusted, in part, through the number of windings of the loopstick antennas 110, 120 and a tuning capacitance.

The loopstick antennas 110, 120 may be coupled to feed lines, amplifiers, or preamplifiers through a board 430 such as, for example, a printed circuit board. According to one embodiment, the board 430 may include the electronic components such as, for example, preamplifiers for increasing the magnitude of signal received by the loopstick antennas 110, 120. In this embodiment, the loopstick antennas 110, 120 may be active antennas.

According to one embodiment, the input impedance of the compact receive unit 100 matches feed lines and amplifiers by canceling out the reactive impedance. For example, the input impedance of the compact receive unit 100 may be approximately fifty ohms.

Figure 4:
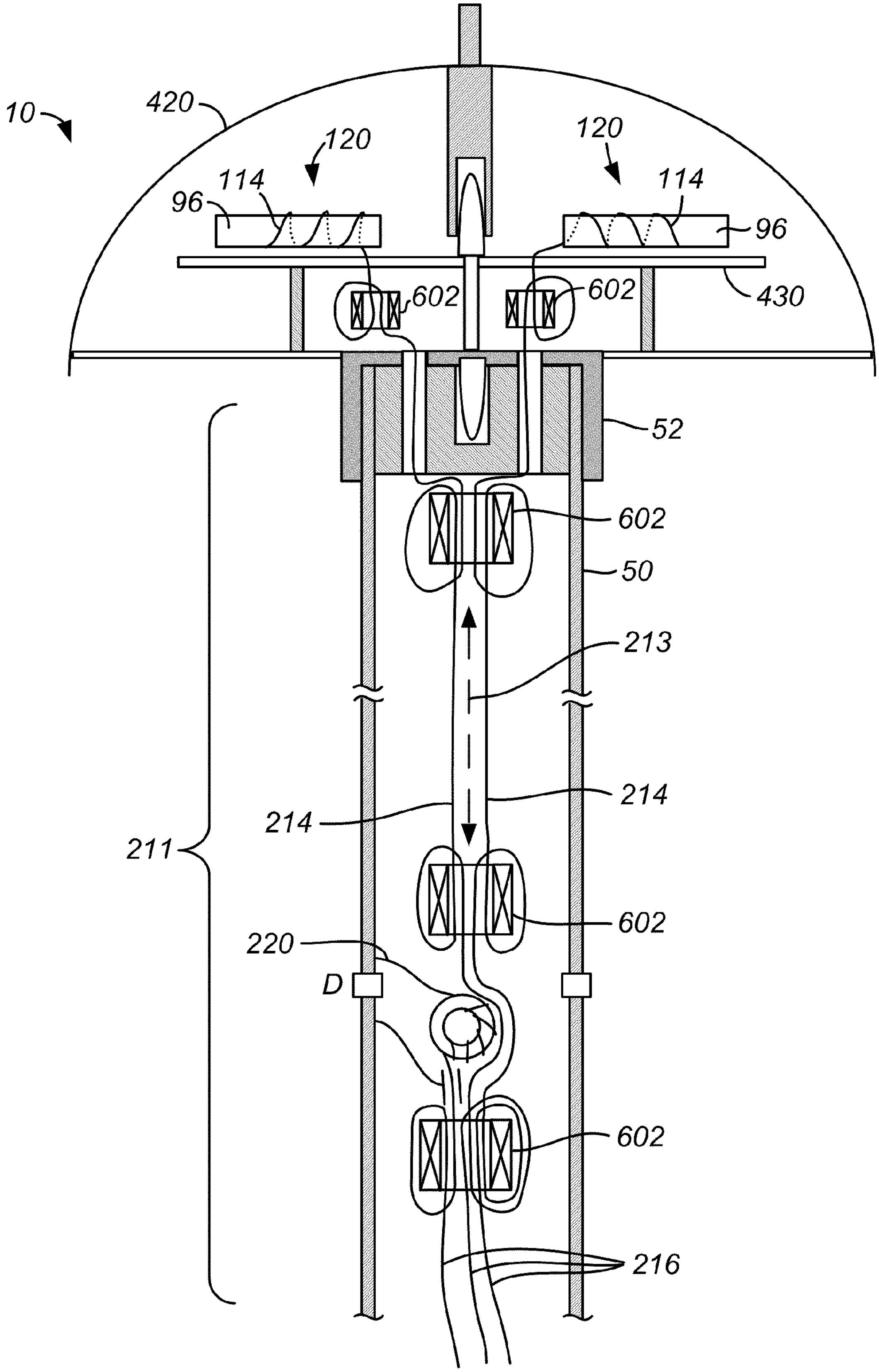
FIG. 4 is a cross-sectional view illustrating an antenna system according to one embodiment.

FIG. 4 is a cross-sectional view illustrating an antenna system according to one embodiment. The antenna system 10 has the receive unit enclosure 420 mounted on the transmit/receive unit 200. The receive unit enclosure 420 includes the first loopstick antenna 110 and the second loopstick antenna (extending out of the page). The loopstick antenna 110 may be, for example, a ferrite rod 96 wrapped with a wire 114.

The dipole antenna portions 214, 216 may not include equal number of wires. For example, one wire of the lower dipole antenna portion 216 may couple to a feed point 220. The feed point is on a conducting cylinder 50, such as aluminum. The conducting cylinder 50 is encased in a vertical fiberglass cylinder for structural rigidity as well as for protection from weather and other natural elements.

The conducting cylinder 50 carries currents on a surface of the conducting cylinder, and the currents may transmit or receive signals. In the case of the lower dipole antenna portion 216 being a coaxial cable, the currents on the conducting cylinder 50 may induce currents on an outer shield of the lower dipole antenna portion 216. Currents on the lower dipole antenna portion 216 and the conducting cylinder 50 may couple to create an unsymmetrical radiation pattern. Along the dipole antenna portions 214, 216 may be one or more decoupling devices such as ferrite filters 602.

The ferrite filters 602 placed along the lower dipole antenna portion 216 and the upper dipole antenna portion 214 reduce coupling between (decouple) the antenna portions 214, 216 and the conducting cylinder 50 (and/or between the antenna portions 214, 216 and the loopstick antennas) due to the dissymmetry of the feed being placed on one side of the dipole or monopole conducting cylinder.

Each of the ferrite filters 602 may present an impedance to current flow of approximately 50 to 100 ohms. The impedance of each ferrite filter 602 is based, in part, on a number of turns of wire within an inner diameter on the ferrite filter 602.

For example, if three or four turns are used, impedance of the ferrite filter 602 may exceed 500 ohms.

According to one embodiment, several ferrite filters 602 are placed at locations near the feed point 220. In another embodiment, coupling may be measured while ferrite filters 602 are individually added. When a point of diminishing return is reached such that additional ferrite filters 602 do not reduce coupling, no more ferrite filters 602 are added.

A position of the feed point 220 determines, in part, coupling within the antenna system 10. According to one embodiment, the feed point 220 is held in a relatively constant location by foam filler (not shown). The foam filler may be placed in several locations to prevent cable position changes of the cables.

The antenna system 10 operates along the transmit/receive axis 213, which is substantially parallel to the length 211 of the transmit/receive antenna 210.

Figure 5:
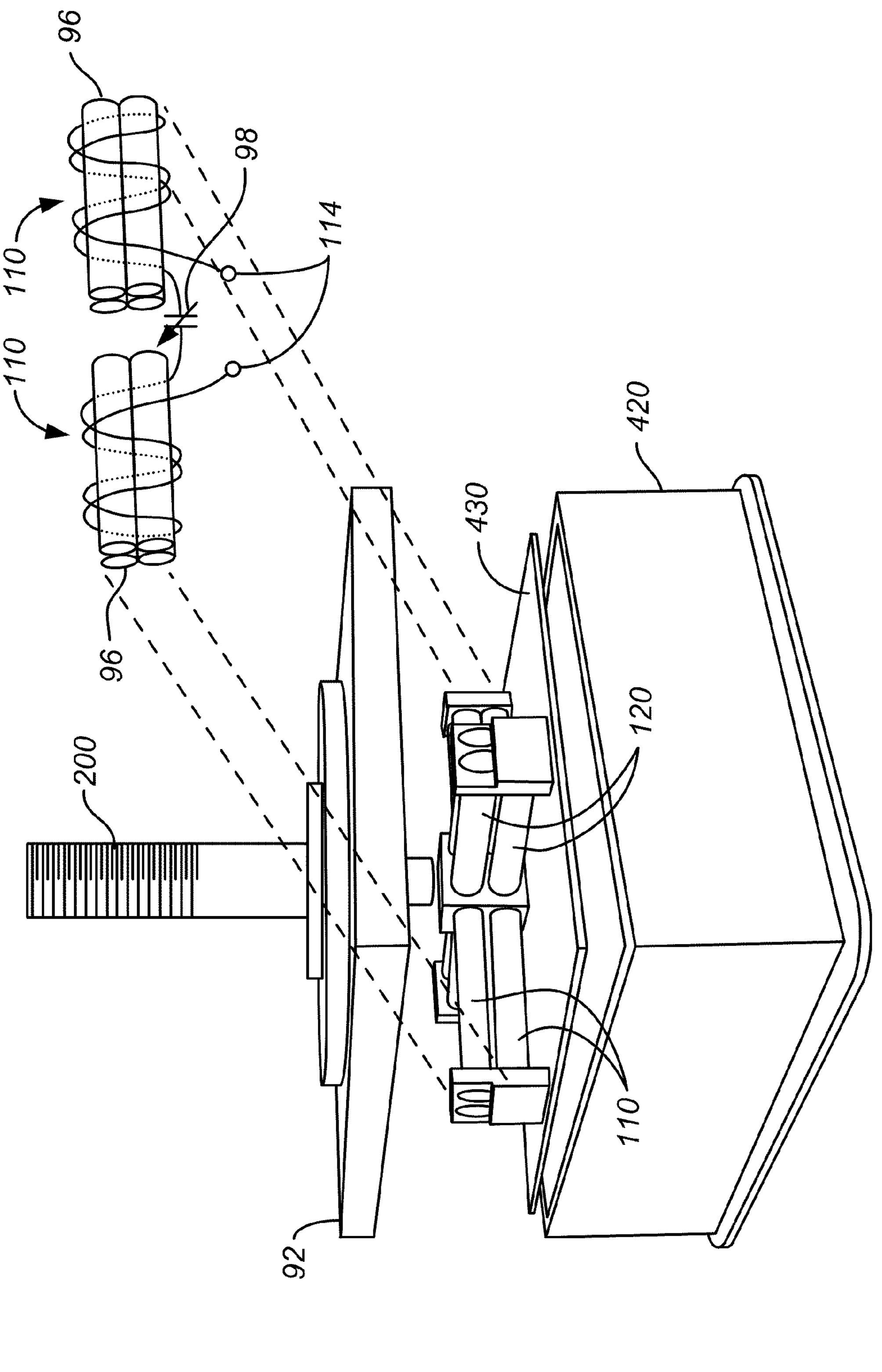
FIG. 5 is a block diagram illustrating a three element collocated crossed-loopstick and monopole receive antenna unit according to one embodiment.

FIG. 5 is a block diagram illustrating a three element collocated crossed-loopstick and monopole receive antenna unit according to one embodiment. An embodiment of a three element collocated crossed-loopstick and monopole receive antenna unit is disclosed in U.S. Pat. No. 5,361,072, which is incorporated by reference here. The board 430 is coupled to the first loopstick antenna 110 and the second loopstick antenna 120. The board 430 may be a printed circuit board and include preamplifiers coupled to the antennas 110, 120. The first loopstick antenna 110 includes ferrite rods 96 and a wire 114 wrapped around the ferrite rods 96. A tuning capacitor 98 is coupled between ferrite rods 96.

According to one embodiment, the antennas 110, 120, and other antennas have substantially equal signal levels. The material of the ferrite rods 96 and preamplifiers on the board 430 may be selected to optimize a ratio of external noise to internal noise. For example, margins exceeding 10 decibels may be obtained. Larger margins generally do not increase the signal-to-noise ratio (SNR) of the antenna system 10.

The board 430 and antennas 110, 120 are enclosed in the receive unit enclosure 420 with a weatherproof lid 92. The transmit/receive unit 200 is attached to the weatherproof lid 92.

Figure 6:
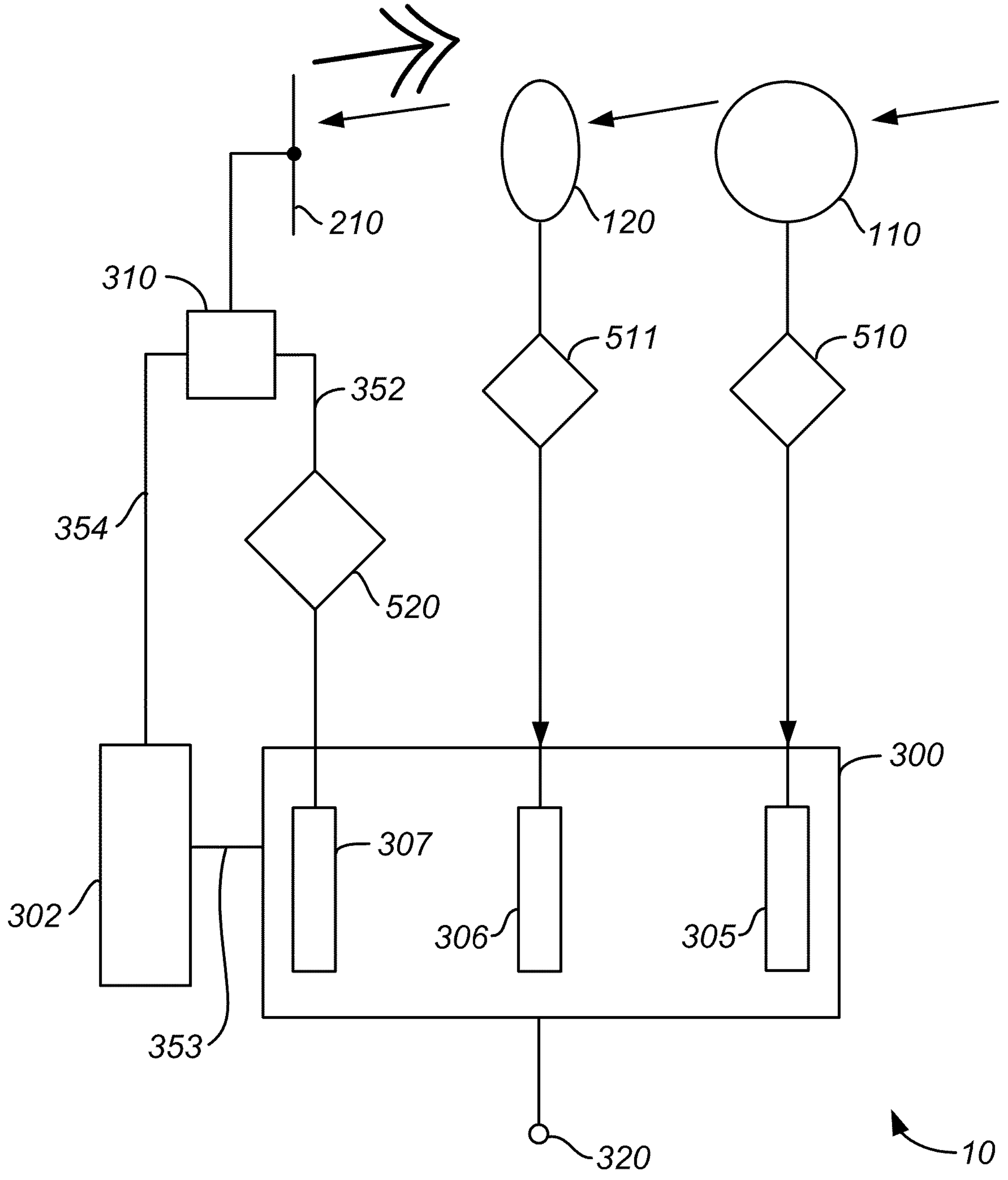
FIG. 6 is a block diagram illustrating a combined radar transmit and receive antenna according to one embodiment.

FIG. 6 is a block diagram illustrating a combined high frequency radar transmit and receive antenna according to one embodiment. The antenna system 10 includes a receiver module 300, which may be, for example, a Direct Digital Synthesizer (DDS) chip. A receiver output signal 353 couples the receiver module 300 to a transmit amplifier 302. An amplified receiver output signal 354 couples the transmit amplifier 302 to a transmit/receive switch 310. A second receiver input signal 352 couples the transmit/receive switch 310 to a receiver module channel 307 through a second preamplifier 520.

The transmit/receive switch 310 switches coupling of a transmit/receive antenna 210 to either receive the second receiver output signal 354 or to provide the second receiver input signal 352. That is, the transmit/receive switch 310 may control the transmit/receive antenna 210 to transmit the second receiver output signal 354 or receive the second receiver input signal 352.

According to one embodiment, the transmit/receive switch 310 operates to couple the second receiver input signal 352 to the transmit/receive antenna 210 fifty percent (half) of the time. During the remaining fifty percent (half) of the time the transmit/receive switch 310 operates to couple the transmit/receive antenna 210 to the amplified receiver output signal 354. The antennas 110, 120 may receive signals one hundred percent of the time. Signals received at the antennas 110, 120, 210 may include reflections from targets illuminated by the antenna 210 (e.g., while the transmit/receive switch 310 couples the transmit/receive antenna 210 to the second receiver input signal 352 such that receiver module channel 307 can receive the second receiver input signal 352).

The transmit amplifier 302 may increase the magnitude of the receiver output signal 353 to a magnitude appropriate for transmission on the transmit/receive antenna 210. The transmit amplifier 302 may either be a fixed amplifier or variable controlled through a manual setting or automated controls. The second preamplifier 520 increases the magnitude of the second receiver input signal 352 received from the transmit/receive antenna 210 to a magnitude appropriate for processing in the receiver module 300. According to one embodiment, the antenna is configured such that during amplification the signal to noise ratio (SNR) of signals being amplified may remain constant.

The transmit/receive antenna 210 may be, for example, a single dipole or monopole antenna, which radiates omnidirectionally to illuminate a sea surface. Additionally a first loopstick antenna 110 and a second loopstick antenna 120 may receive HF or VHF signals. The loopstick antennas 110, 120 are coupled to receiver channel modules 305, 306 of the receiver module 300 through preamplifiers 510, 511, respectively.

The receiver channel modules 305, 306, 307 inside the receiver module 300 process signals received from the antennas 110, 120, 210, respectively. Processing may include, for example, demodulation and digitization. A combined digital signal 320 is output from the receiver module 300 and may be coupled to additional components for further processing, storage, or display.

An antenna system as described above has low coupling between the receive antennas and the transmit/receive antenna. Reduced coupling results in more ideal antenna patterns such as, for example, cosine/sine patterns for the loopstick antennas and omni-directional patterns for the dipole or monopole antenna. Additionally, efficiency of the dipole or monopole antenna increases and adequate bandwidth is obtained for the spectral width of desired radar signals. Further, the size and cost of the antenna system is reduced by lowering visible obtrusiveness and allowing structure robustness.

Descriptions of well known assembly techniques, components, and equipment have been omitted so as not to unnecessarily obscure the present methods, apparatuses, an systems in unnecessary detail. The descriptions of the present methods and apparatuses are exemplary and non-limiting. Certain substitutions, modifications, additions and/or rearrangements falling within the scope of the claims, but not explicitly listed in this disclosure, may become apparent to those of ordinary skill in the art based on this disclosure.

The appended claims are not to be interpreted as including means-plus-function limitations, unless such a limitation is explicitly recited in a given claim using the phrase(s) "means for" and/or "step for," respectively.

The invention claimed is:

1. An antenna system configured to transmit and receive radar signals, the antenna system comprising:

a compact receive unit configured to receive HF or VHF radar signals, the compact receive unit including:

a first loopstick antenna having a first phase center and a first loopstick axis; and a second loopstick antenna having a second phase center and a second loopstick axis that is substantially orthogonal to the first loopstick axis;

wherein the compact receive unit is disposed within a receive unit enclosure that is hermetically sealed;

a transmit/receive unit configured to transmit and receive the HF or VHF radar signals, the transmit/receive unit including:

a substantially vertical transmit/receive antenna having:

a transmit/receive phase center, wherein the transmit/receive phase center, the first phase center, and the second phase center are substantially collinear along a substantially vertical axis; and a transmit/receive axis that is substantially orthogonal to the first loopstick axis and to the second loopstick axis;

a conducting cylinder enclosing at least a portion of the substantially vertical transmit/receive antenna; and at least one decoupling device inside the conducting cylinder and surrounding a portion of the substantially vertical transmit/receive antenna to decouple the substantially vertical transmit/receive antenna from the conducting cylinder and from the loopstick antennas; and a receiver module coupled to the compact receive unit and to the transmit/receive unit, the receiver module being configured to:

receive a first receiver input signal from the compact receive unit;

receive a second receiver input signal from the transmit/receive unit; and output a receiver output signal that is amplified and is inputted to the transmit/receive unit.

2. The antenna system of claim 1, further comprising a substantially vertically oriented mast configured to structurally support a portion of the antenna system.

3. The antenna system of claim 2, wherein the transmit/receive antenna is a dipole antenna.

4. The antenna system of claim 3, wherein the dipole antenna comprises:

an upper dipole antenna portion having a top end; and a lower dipole antenna portion that is disposed within the mast, the lower dipole antenna portion having a bottom end.

5. The antenna system of claim 4, wherein the receive unit enclosure is disposed at the top end of the upper dipole antenna portion.

6. The antenna system of claim 4, wherein the receive unit enclosure is disposed at the bottom end of the lower dipole antenna portion.

7. The antenna system of claim 4, wherein the upper dipole antenna extends substantially vertically from the receive unit enclosure.

8. The antenna system of claim 2, wherein the transmit/receive antenna is a monopole antenna.

9. The antenna system of claim 8, wherein the monopole antenna is disposed within the mast.

10. The antenna system of claim 9, wherein the mast has a top end, and the receive unit enclosure is disposed at the top end of the mast.

11. The antenna system of claim 1, further comprising a first preamplifier that is configured to amplify the first receiver input signal by a first gain prior to the first receiver input signal being received by the receiver module.

12. The antenna system of claim 11, wherein the antenna system is configured such that the second receiver signal is not amplified prior to being received by the receiver module.

13. The antenna system of claim 11, further comprising a second preamplifier that is configured to amplify the second receiver input signal by a second gain prior to the second receiver input signal being received by the receiver module, wherein the second gain is different than the first gain.

14. The antenna system of claim 1, wherein the first loopstick antenna and the second loopstick antenna each comprise:

a core; and a wire configured to form multiple turns around the core;

wherein the total length of each of the respective wires is less than about one tenth of the wavelength of the HF or VHF radar signal.

15. The antenna system of claim 14, wherein the transmit/receive antenna is a dipole antenna having a length that is between about 60% and 100% of one half of the wavelength of the HF or VHF radar signal.

16. The antenna system of claim 14, wherein the transmit/receive antenna is a monopole antenna having a length that is between about 60% and 100% of one quarter of the wavelength of the HF or VHF radar signal.

17. The antenna system of claim 1, wherein:

the transmit/receive antenna is a dipole antenna that has a length; and the first loopstick antenna and the second loopstick antenna each comprise:

a core; and a wire configured to form multiple turns around the core;

wherein the total length of each of the respective wires is less than or equal to about one fifth of the length of the transmit/receive antenna.

18. The antenna system of claim 1, wherein:

the transmit/receive antenna further comprises a feed point; and the first loopstick antenna and the second loopstick antenna are disposed at least one meter away from the feed point of the transmit/receive antenna.

19. The antenna system of claim 1, wherein the at least one decoupling device comprises at least one ferrite filter.

* * * * *